(12) United States Patent
Yu et al.

(10) Patent No.: US 7,627,107 B2
(45) Date of Patent: Dec. 1, 2009

(54) METHOD AND SYSTEM FOR INVOKING THE SERVICE IN THE INTELLIGENT NETWORK

(75) Inventors: Qian Yu, Shenzhen (CN); Junsong Yi, Shenzhen (CN)

(73) Assignee: Huawei Technologies, Co., Limited, Shenzhen, Guangdong Province (CN)

( * ) Notice: Subject to any disclaimer, the term of this patent is extended or adjusted under 35 U.S.C. 154(b) by 0 days.

(21) Appl. No.: 11/667,794

(22) PCT Filed: Nov. 10, 2005

(86) PCT No.: PCT/CN2005/001895

§ 371 (c)(1),
(2), (4) Date: Feb. 14, 2008

(87) PCT Pub. No.: WO2006/050668

PCT Pub. Date: May 18, 2006

(65) Prior Publication Data

US 2009/0003572 A1    Jan. 1, 2009

(51) Int. Cl.
*H04M 7/00* (2006.01)
*H04M 3/42* (2006.01)

(52) U.S. Cl. .............................. 379/221.09; 379/201.12; 379/221.12

(58) Field of Classification Search ............. 379/201.12
See application file for complete search history.

(56) References Cited

U.S. PATENT DOCUMENTS

| | | | | |
|---|---|---|---|---|
| 4,924,510 A | * | 5/1990 | Le ......................... | 379/221.09 |
| 5,386,467 A | * | 1/1995 | Ahmad ................... | 379/221.08 |
| 6,141,409 A | * | 10/2000 | Madoch et al. ........ | 379/207.02 |
| 6,201,861 B1 | * | 3/2001 | Pykalisto .............. | 379/201.01 |
| 6,266,535 B1 | | 7/2001 | Cullen et al. | |
| 6,560,327 B1 | | 5/2003 | McConnell | |
| 6,631,186 B1 | * | 10/2003 | Adams et al. .......... | 379/201.12 |
| 6,731,743 B2 | * | 5/2004 | Kovarik et al. ............... | 379/229 |
| 2002/0154756 A1 | * | 10/2002 | Jellema et al. ......... | 379/220.01 |

FOREIGN PATENT DOCUMENTS

| | | |
|---|---|---|
| CN | 1194079 | 9/1998 |
| CN | 1407773 A | 4/2003 |
| EP | 1 051 046 A2 | 11/2000 |
| GB | 2330039 A | 4/1999 |
| WO | WO 9851094 A2 | 11/1998 |
| WO | WO 00/16567 A2 | 3/2000 |

OTHER PUBLICATIONS

International Search Report from corresponding International Application No. PCT/CN2005/001895, filed Nov. 10, 2005.

* cited by examiner

*Primary Examiner*—Harry S Hong
(74) *Attorney, Agent, or Firm*—Darby & Darby P.C.

(57) ABSTRACT

A method for invoking the service in the intelligent network includes realizing the communication between the different service control points in the intelligent network and providing various intelligent service to the users by the cooperation between the communicating service control points according to the service request information of the user. The method for invoking the service in the intelligent network of the present invention enables the process of invoking the intelligent service to have better application and extensibility. The process of various service invoking needn't limit to the service control point of the same manufacture.

11 Claims, 4 Drawing Sheets

METHOD AND SYSTEM FOR INVOKING THE SERVICE IN THE INTELLIGENT NETWORK

FIELD OF THE INVENTION

The present invention relates to the field of Intelligent Network, and particularly to a method and system for invoking services in an Intelligent Network.

BACKGROUND OF THE INVENTION

The Intelligent Network (IN) is an additional network constructed on the basis of an existing communication network, which rapidly introduces intelligent services to an existing network system. The intelligent services may be implemented in a switching center in the existing network system. However, most switching centers in the existing network system provide no or little intelligent service functionalities, thus the switching center in the existing network system could be upgraded to implement the intelligent services. Moreover, some intelligent services are new services in the whole network system, and are not generally limited to be in the range of an individual switching center or an individual local network. As such, all of the switching centers in the existing network system should be upgraded every time a new intelligent service is added. Since there are a large number of switching centers in the network system, it should take a long period of time as well as a lot of manpower and material resources to complete the upgrade operations.

The above-mentioned reasons lead to the generation of the IN. A characteristic of the IN is the separation of network switching from service control, in other words, the switching centers perform basic switching/connection functionalities, and a plurality of newly added functional nodes cooperate with the switching centers in the existing network system to perform new intelligent service functionalities.

Figure 1:
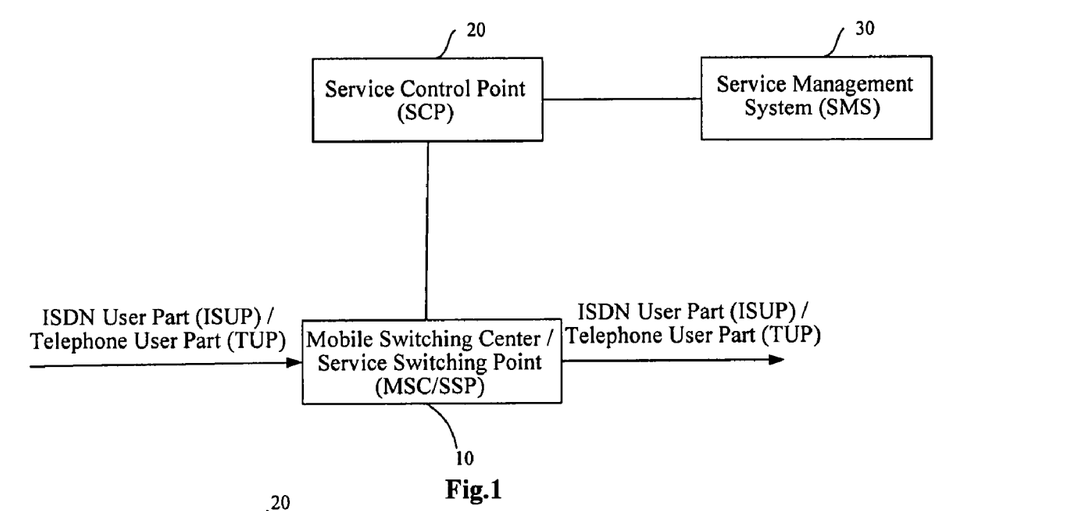
FIG. 1 is a simplified diagram illustrating structure of an IN system in a GSM mobile communication network.

Referring to FIG. 1, there is shown a block diagram illustrating a simplified structure of an IN system in a GSM mobile communication network. The IN system in the GSM mobile communication network mainly includes a Service Control Point (SCP) 20 and a Service Management System (SMS) 30, which includes a maintenance management terminal with a graphical interface, a Service Creation Environment (SCE), etc. The whole IN system provides various intelligent services using a service switching point (SSP) with a service switching capability. In the case that switching network devices have not been upgraded, the SSP exists independent of a Mobile Switching Center (MSC), thus the SSP triggers the corresponding intelligent services in the SCP 20 according to number segment or access code information, etc. of a calling/called user, such a mode for triggering intelligent services is defined as overlay network-based trigger. By contrast, in the case that the switching network devices have been upgraded, the SSP and the MSC may be arranged in the same device entity to form a MSC/SSP 10 with the service switching capability, thus the MSC/SSP 10 triggers the corresponding intelligent services in the SCP 20 according to the Origination/Termination-CAMEL Subscription Information (O/T-CSI) of the calling/called user, such a mode for triggering intelligent services is defined as target network-based trigger.

The process for operating the IN in the GSM mobile communication network shown in FIG. 1 is mainly as follows:

1) during the process in which a mobile calling user who has registered intelligent services calls a mobile called user, the MSC/SSP 10 with the service switching capability triggers the SCP 20 to provide the corresponding intelligent services according to the O/T-CSI of the calling/called user or according to the number segment or access code information, etc. of the calling/called user;

2) a service logic processing program and a service module containing service data are arranged in the SCP 20; when the MSC/SSP 10 with the service switching capability transmits a trigger message in the form of a CAMEL Application Part (CAP) message to the SCP 20, according to the trigger message, the SCP 20 performs the corresponding intelligent service logic to control the MSC/SSP 10;

3) the SCP 20 is further managed by the SMS 30. In particular, a maintenance and management terminal of the SMS 30 loads new intelligent services or upgrades existing intelligent services for the SCP 20, charges for the corresponding intelligent services used by the user, and provides the functions of operating statistics and reporting management, etc.

The IN system may provide the mobile communication network with abundant intelligent services, such as Pre-pay service, Mobile Virtual Private Network (MVPN) service, Coloring Ring Back Tone service, etc. Moreover, the IN may provide intelligent services rapidly and flexibly for users without reforming all of the switches in the network.

However, with the gradual increase of intelligent service types provided by the IN, it is inevitable that the IN have to analyze, match and process various registered intelligent services simultaneously during the process for processing the same call initiated by the same user. There is no existing specification for implementing exchange and cooperation among different SCPs to provide a service invocation capability. Thus, overlap functions of the services cannot be provided by a simple combination of the services, and thus it is inevitable that the various intelligent services are entangled and interlaced with each other because the IN analyzes and processes them simultaneously. This leads to an increased complexity of logic processing of the intelligent services and an influence of the upgrading of a certain service on the other intelligent services. Therefore, all of these aspects have a negative impact on the development of the IN system.

Nowadays, there are mainly two modes for invoking services in the IN, which are herein defined as primary trigger and secondary trigger, respectively. Simplified processes for invoking services in the above two modes will be respectively described hereinafter.

Figure 2:
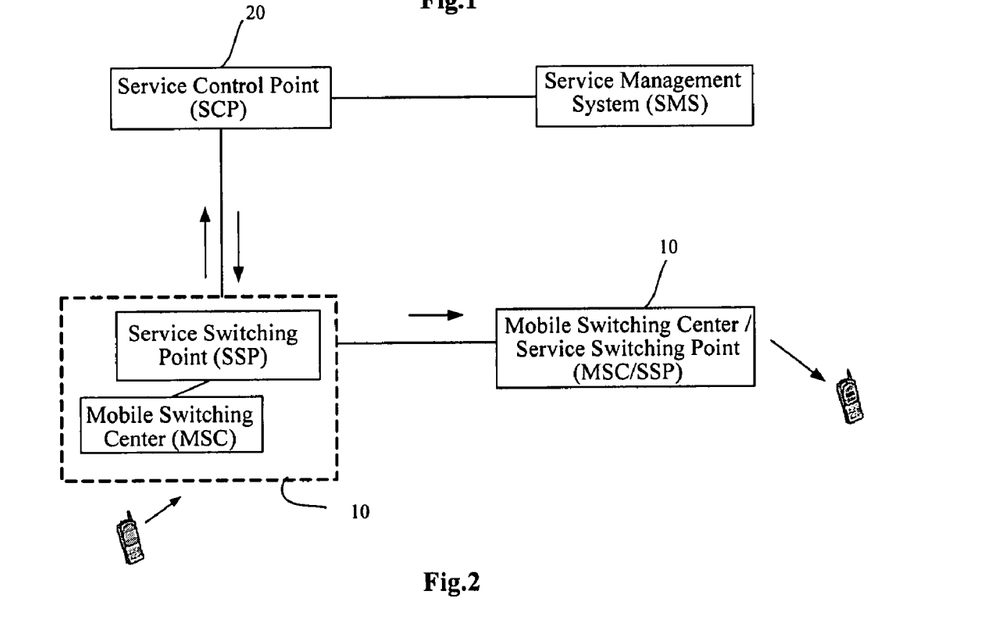

Referring to FIG. 2, which is a schematic diagram illustrating a process for invoking services by means of primary trigger in a IN, the process includes the following steps:

a mobile calling user calls a mobile called user;

the MSC/SSP 10 with the service switching capability triggers the SCP 20 to provide the corresponding intelligent service according to the O/T-CSI of the calling/called user or according to the number segment or access code information, etc. of the calling/called user;

the SCP 20 processes the call initiated by the calling user, and invokes the corresponding intelligent services according to the trigger message transmitted from the MSC/SSP 10;

the SCP 20 controls the MSC/SSP 10 to process a session between the calling user and the called user by executing the invoked intelligent service logic, the call is released when the session ends, then the session is billed in the SCP 20.

the MSC/SSP 10 triggers a single SCP 20 every time a service invocation is performed by means of the primary trigger, i.e., all service invocations would be processed in that SCP 20, thus, in the case that the user has registered multiple intelligent services, the SCP 20 would suffer from a high complexity of logic processing due to the simultaneous invocations of multiple services. Moreover, since the techniques implemented in the SCP 20 are generally manufacturer-specific, the simultaneous invocations of multiple services implemented in that SCP 20 would be accomplished by a single manufacturer. As a result, the process for invoking multiple services simultaneously by means of the primary trigger has a relatively low degree of compatibility.

Figure 3:
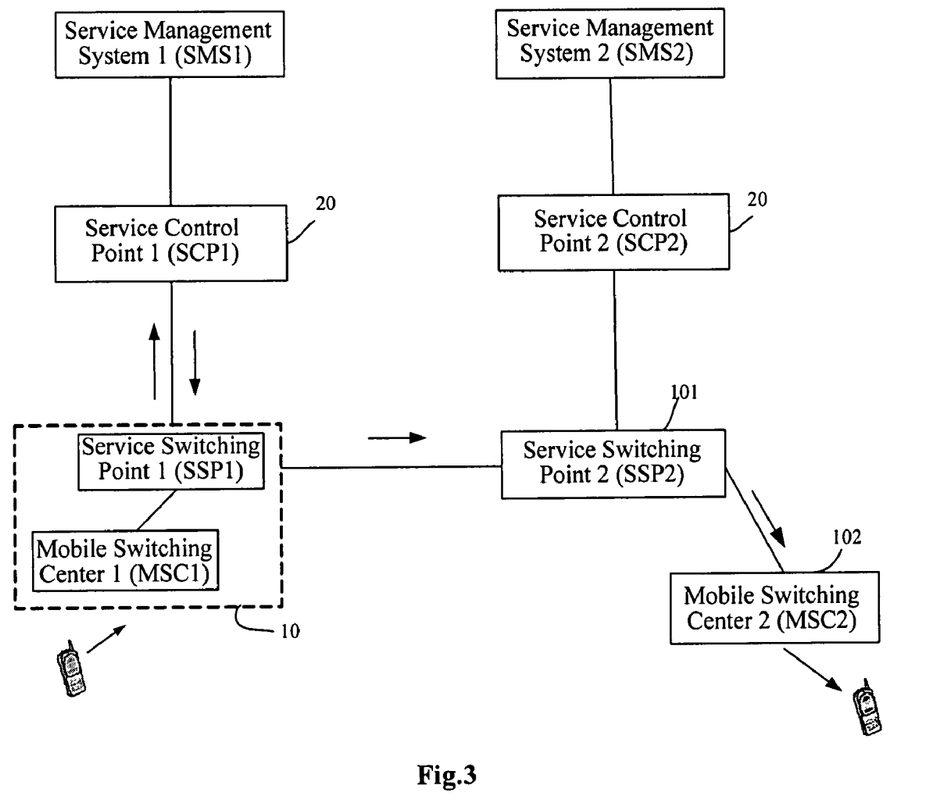

Referring to FIG. 3, which is a schematic diagram illustrating a process for invoking services by means of secondary trigger in a IN, the process mainly includes the following steps:

The MSC/SSP 10 with the service switching capability triggers the SCP 20 to provide the corresponding intelligent services according to the O/T-CSI of the calling/called user or according to the number segment or access code information, etc. of the calling/called user;

the SCP1 20 invokes the corresponding intelligent services according to the trigger message transmitted from the MSC1/SSP1 10, and controls the MSC1/SSP1 10 to trigger the MSC1/SSP1 10 to perform a call connection by executing the corresponding invoked service logic;

the MSC1/SSP1 10 routes the call to the SSP2 101 according to the prearranged route data;

the SSP2 101 triggers the SCP2 20' for the second time to provide the corresponding intelligent services according to the number segment or access code information etc. of the calling/called user (in this case, the trigger for the second time would be of the overlay network-based trigger due to the existence of the route data);

the SCP2 20' invokes the corresponding intelligent services according to the trigger message transmitted from the SSP2 101, and controls the SSP2 101 to trigger the SSP2 101 to perform the call connection by executing the corresponding invoked service logic;

a session is established between the calling user and the called user under the controls of both the SCP1 20 and the SCP2 20', the call is released when the session ends, then the session is billed both in the SCP1 20 and SCP2 20'.

Each of the above-mentioned SCPs is used for processing one part of the intelligent service logic invocation by the calling/called user. For example, the SCP1 20 provides a pre-paid intelligent service logic, and the SCP2 20' provides an IP card number intelligent service logic. If the calling/called user uses a pre-paid service (PPS), as well as an IP card number service in the current call, the SCP1 20 is triggered to invoke the pre-paid intelligent service logic, and the SCP2 20' is triggered to invoke the IP card number intelligent service logic during the call connection. Therefore, such a mode for invoking services is defined as secondary trigger.

However, according to a trigger rule, the trigger according to the O/T-CSI of the user is generally superior to the trigger according to the number segment or access code information of the user. As a result, this mode is more suitable for the secondary trigger in which the trigger for the first time is of the target network-based trigger and the trigger for the second time is of the overlay network-based trigger, therefore, it has a relatively low degree of compatibility;

Furthermore, it is required to arrange route data in the MSC1/SSP1 10 with the service switching capability, which is connected to the first SCP 20 of the SCPs 20. Also, voice channel alternation necessarily exists during the process for routing the voice channel from the MSC1/SSP1 10 to another SSP 101. If the calling user and called user are located in the same location, while the SSP 101 is located in a different location, there will be long-distance voice channel alternations from the MSC1/SSP1 10 to the SSP 101 and from the SSP101 to the MSC2 102 (referring to FIG. 3).

SUMMARY OF THE INVENTION

An embodiment of the present invention is to provide a method for invoking services in an IN, by the method, a process of invoking intelligent services has a relatively high degree of compatibility and expandability, and it is unnecessary to process various service invocations in SCPs of the same manufacturer.

An embodiment of the present invention provides a method and system for invoking services in an IN. The method includes the steps of:

receiving, by a first service control point, service request information transmitted by a service switching point, wherein the service request information contains information about at least one service requested by a user, the first service control point is capable of invoking a service;

determining, by the first service control point, at least one second service control point corresponding to the at least one service according to the service request information, and invoking the at least one service from the at least one second service control point.

A system embodiment of the present invention includes a service switching point, a first service control point and at least one second service control point. In the system embodiment, the service switching point is capable of transmitting service request information to the first service control point; the first service control point is capable of receiving the service request information transmitted by the service switching point, determining at least one second service control point providing the service requested in the service request information, and invoking the second service control point according to the service request information; the second service control point is capable of providing the service in response to the invocation by the first service control point.

An embodiment of the present invention provides a service control device for invoking services, including: a unit capable of receiving service request information transmitted by a service switching point; a determining unit capable of determining at least one other service control point corresponding to a service according to the service request information; and an invoking unit capable of invoking the at least one other service control point according to the service request information.

Another embodiment of the present invention provides a service control device for invoking services, including: a unit capable of receiving service invoking request information transmitted by an invoking service control point; and a service processing unit capable of providing a service to the user according to the service invoking request information.

Some embodiments of the present invention is able to provide, for example, an abundant service invocation capability for the user without changing the basic architecture of a network system, therefore, the cost for updating the network system is reduced.

BRIEF DESCRIPTION OF THE DRAWINGS

FIG. 2 is a schematic diagram illustrating a process for invoking services by means of primary trigger in a IN;

FIG. 3 is a schematic diagram illustrating a process for invoking services by means of secondary trigger in a IN;

DETAILED DESCRIPTION OF THE EMBODIMENTS

A method for invoking services in an IN according to an embodiment of the present invention is allocating a processing of multiple service invocations otherwise accomplished by a single SCP to various SCPs, thereby reducing the complexity of the processing of multiple service invocations and to save resource and provide more intelligent services for IN users.

The method and system for invoking services in the IN according to the embodiment of the present invention will be described in detail with reference to the accompanying drawings.

Figure 4:
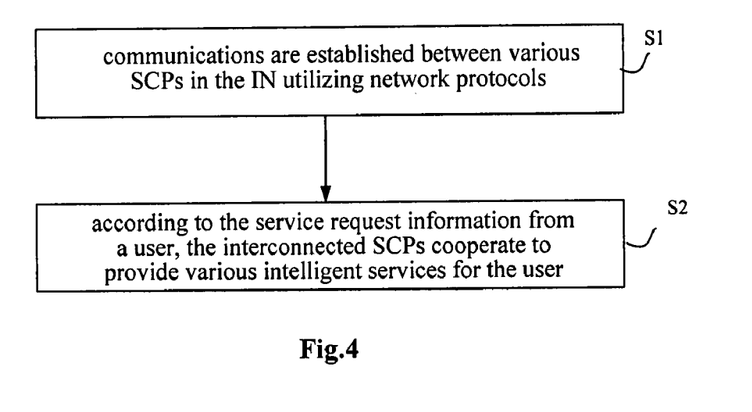
FIG. 4 is a simplified flowchart illustrating a process for invoking services in an IN according to an embodiment of the present invention.

Referring to FIG. 4, there is shown a flowchart illustrating a process for invoking services in the IN according to an embodiment the present invention. The process mainly includes the following steps.

In S1, communications among SCPs in the IN are established utilizing network protocols, such as Signaling System No. 7 (SS7), Data Communication Network protocols (e.g., TCP/IP), etc.

In S2, according to the service request information of a user (that information contains the information on several intelligent services registered in the current IN system), the various SCPs cooperate to provide various intelligent services for the user by utilizing the communications established in S1.

In the above-described process, all of the interconnected SCPs in the IN may be configured with a service invocation capability, and in S2, the SCPs with the service invocation capability may cooperate to provide various intelligent services for the user. Alternatively, one of the interconnected SCPs in the IN may be configured with the service invocation capability, while the other SCPs are not configured with the service invocation capability, and in S2, the SCP with the service invocation capability invokes the other SCPs without the service invocation capability, so as to cooperate therewith to provide various intelligent services for the user.

Figure 5:
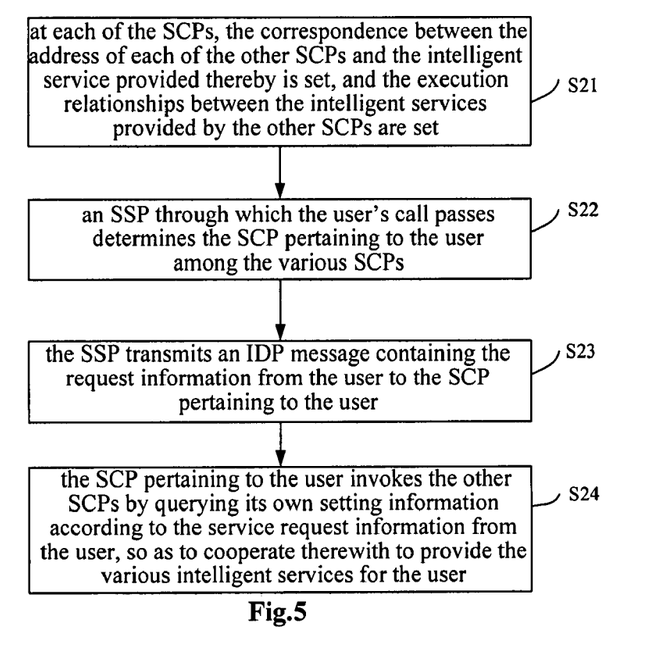
FIG. 5 is a simplified flowchart illustrating a process of service invocations among various SCPs in an IN according to an embodiment of the present invention.

Referring to FIG. 5, there is shown a simplified flowchart illustrating a process of service invocations among various SCPs in an IN according to an embodiment of the present invention. The process is as follows.

In S21, in each of the SCPs in communications, the correspondence between the address of each of the other SCPs and the intelligent service provided by the SCP is arranged, and an execution relationship among the intelligent services provided by the other SCPs is arranged. In this case, the executive relationships among the various services include, but are not limited to, parallel execution, priority execution and mutual exclusion execution. As mentioned above, the SCP1, SCP2 and SCP3 are in communications. Consider the following cases: the service provided by the SCP1 is a VPN service, the address of the SCP1 is 192.168.0.1; the service provided by the SCP2 is a PPS, the address of the SCP2 is 192.168.0.2; and the service provided by the SCP3 is a card number service, the address of the SCP3 is 192.168.0.3; and the execution relationship among the VPN service, PPS and card number service is that the VPN service is superior to the PPS, and the PPS is superior to the card number service, i.e., the execution relationship among the above three services is priority execution. Based on this example, the following correspondences and execution relationships are required to be established in the SCP1:

| SCP ID | Address | Service | execution relationship |
|---|---|---|---|
| SCP2 | 192.168.0.2 | PPS | 1 |
| SCP3 | 192.168.0.3 | Card Number Service | 2 |

Once S21 has been performed, on the premise that an SCP in communication with other SCPs cannot provide its corresponding intelligent service, the SCP may determine which SCP is required to be invoked to provide another intelligent service for the user by querying the information arranged in the home local SCP according to the service request information of the user. For example, on the premise that the SCP1 cannot provide the PPS and the card number service for the user, the SCP1 may invoke the SCP2 to trigger the SCP2 to provide the PPS for the user by querying the information arranged in the home local SCP (since the PPS is superior to the card number service, it can be determined that the address of the SCP2 capable of providing the PPS is 192.168.0.2.) according to the service request information of the user.

In S22, during the process in which the mobile network system processes the user's call, an SSP through which the user's call passes may transmit an Initial Detect Point (IDP) message containing the service request information of the user to a home local SCP. The SSP may determine the home local SCP according to the number segment or access code information of the user. The SSP may also determine the home local SCP according to the CAMEL subscription information of the user.

In S23, upon receiving the IDP message transmitted from the SSP, the home local SCP invokes the other SCPs by querying the information arranged in the home local SCP according to the service request information of the user contained in the IDP message, so as to cooperate therewith to provide the various intelligent services for the user.

Figure 6:
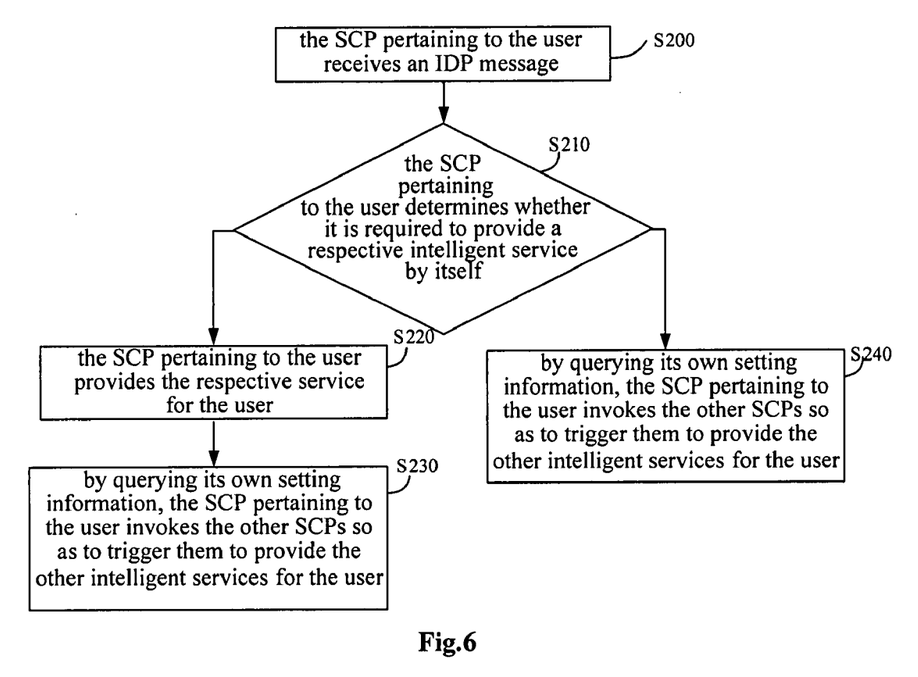
FIG. 6 is a flowchart illustrating a process in which a home local SCP invokes other SCPs in an IN according to an embodiment of the present invention.

Referring to FIG. 6, there is shown a flowchart illustrating a process in which a home local SCP invokes other SCPs in an IN according to an embodiment of the present invention.

In S200, the home local SCP receives the IDP message transmitted from the SSP, and obtains the various intelligent services requested by the user by parsing the service request information of the user contained in the IDP message.

In S210, the home local SCP determines whether it needs to provide a corresponding intelligent service by itself according to the service request information of the user (i.e., according to the intelligent services that the user requests), the intelligent service it can provide, and the fact whether the user has registered the requested service, and if so, performs S220, otherwise, performs S240.

In S220, the home local SCP provides the intelligent service it can provide for the user;

In S230, the home local SCP invokes the other SCPs so as to trigger the other SCPs to provide the other intelligent services (i.e., the intelligent services it cannot provide) for the user by querying the information arranged in the home local SCP with respect to the intelligent services it cannot provide (in the present invention, such a processing mode is herein defined as invocation), and then the process ends.

In S240, the home local SCP invokes the other SCPs so as to trigger the other SCPs to provide the corresponding intelligent services for the user by directly querying the information arranged in the home local SCP with respect to the intelligent services it cannot provide (in the present invention, such a processing mode is herein referred to as transfer), and the process ends.

Figure 7:
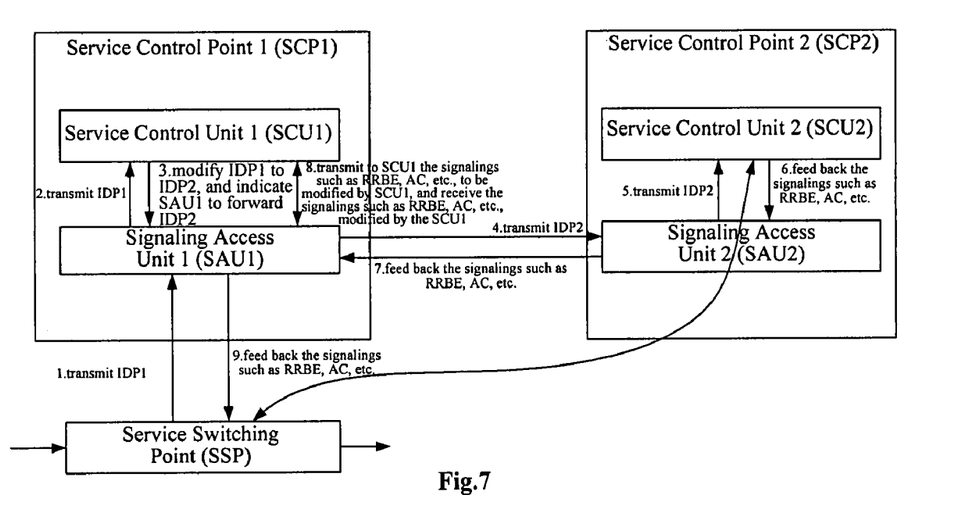
FIG. 7 is a schematic diagram illustrating a process of service invocations among various SCPs in an IN according to an embodiment of the present invention.

Referring to FIG. 7, there is shown a schematic diagram illustrating a process of service invocations among various SCPs in an IN according to an embodiment of the present invention. As shown in FIG. 7, in each SCP, a Service Control Unit (SCU) and a Signal Access Unit (SAU) cooperate with each other, the process during which the SCP1 invokes the SCP2 includes the following steps.

Step 1: the SSP transmits an IDP1 message to the SAU1 in the SCP1.

Step 2: the SAU1 in the SCP1 forwards the IDP1 message to the SCU1 in the SCP1.

Step 3: after an internal interface between the SCU1 and the SAU1 in the SCP1 has modified the IDP1 message to an IDP2 message, the SCU1 instructs the SAU1 to forward the IDP2 message.

Step 4: the SAU1 in the SCP1 forwards the IDP2 message to the SAU2 in the SCP2.

Step 5: the SAU2 in the SCP2 transmits the IDP2 message to the SCU2 in the SCP2.

Step 6: after having processed the IDP2 message, the SCU2 in the SCP2 feeds the signaling such as Request Report BCSM Event (RRBE), Apply Charging (AC), etc., back to the SAU2.

Step 7: the SAU2 in the SCP2 in turn feeds the signaling such as RRBE, AC, etc., back to the SAUL in the SCP1.

Step 8: the SAU1 in the SCP1 transmits to the SCU1 the signaling such as RRBE, AC, etc., to be processed by the SCU1, and receives the modified signaling such as RRBE, AC, etc., fed back from the SCU1.

Step 9: the SAU1 feeds the signaling such as RRBE, AC, etc., back to the SSP, thereby completing the process in which the SCP1 invokes the SCP2 so as to cooperate therewith to provide the intelligent services for the user.

An embodiment of the present invention would be further explained with reference to FIG. 7.

In the method for invoking services in the IN according an embodiment of the present invention, service invocations among various SCPs are mainly implemented via a signaling network or a data network. Thus, after having completed the processing of an intelligent service provided, an SCP may trigger another SCP to invoke a corresponding intelligent service by means of signaling, thereby realizing a service invocation across different SCPs.

In accordance with an embodiment of the present invention, the SCP1 may determine which SCP is the next SCP to be invoked according to the service request information of the user (the service request information of the user contains the intelligent services that the user has registered) as well as information e.g., about which services are predetermined to be run by specific SCPs. The SCPs may also be invoked in a fixed order, e.g., an order determined according to the thought of a designer during a process in which the services are designed or the system is operated, in such an order, for example, the SCP providing a VPN service is invoked firstly, and then the SCP providing a PPS is invoked, the SCP providing a card number service is invoked lastly.

In accordance with an embodiment of the present invention, a service invocation link may be made up of the various SCPs in communications, the period of the link is infinite in theory (however, in practice, the period of an SCP link is finite on the premise that the total delay is acceptable due to a considerable delay of the process for processing each SCP).

For example, in the service link made up of various SCPs in communications, the first SCP of the link knows the existence of other SCPs after it, and invokes the SCPs behind it by means of either invocation or by means of transfer according to the request information of the user; in this case, the invocation means that after the SCP1 (the first SCP of the link) invokes the SCP2 behind it, the SCP1 is required to transmit signalings to the SCP2, to process signalings returned from the SCP2 and to perform corresponding processing; and the transfer means that after the SCP1 invokes the SCP2 behind it, the SCP1 is just required to transmit the first signaling to the SCP2, and will no longer receive signalings, the SCP1 providing a service has exited from the link.

For example, the first SCP of the link provides a PPS, and the user is required to be charged for the service during the user's call, it is necessary for the SCP1 to provide the PPS for the user by means of invocation, rather than by means of transfer, and invokes the SCPs behind it so as to trigger the other SCPs to provide other intelligent services for the user. In contrast, if the user is not required to be charged for the service during the user's call, the SCP2 may be triggered to provide the corresponding intelligent service for the user by means of transfer, and after the SCP1 transmits the first signaling to the SCP2, the SCP1 may exit the process for providing intelligent services.

In accordance with an embodiment of the present invention, the last SCP of the link does not know the existence of any other SCP. Thus, the service and operation management information of the last SCP of the link is not required to be changed, in other words, if an SCP is the last SCP of the link, all of the services arranged in the SCP are not required to be changed for cooperating with new services provided by other SCPs. Thus, if a service was developed previously (i.e., it is an old service), and a new service has been developed, the SCP providing the old service is required to serially connected to the last SCP of the link, and the old service is not required to be modified to adapt to the new service.

A solution of an embodiment of the present invention may have no special demands on the networking, the trigger and the operation management system of an existing basic network. Accordingly, based on the above-mentioned reasons, a method for invoking services in the IN according to the embodiment of the present invention is as follows: a database for storing information of other SCPs is required to be established in an SCP, the information in the database contains the correspondences between the addresses of the other SCPs and the service categories provided the other SCPS, also, in the SCP, an execution relationship is required to be arranged among the services provided by the other SCPs, so as to ensure that the direction in which the service link is invoked is correct and that the exceptions such as infinite loops, etc., will not occur. For example, if a PPS was developed in an existing network previously, a VPN service has been already developed by a new provider, then this provider defines in a home local SCP a service execution relationship in which the VPN service logic is executed before the PPS service logic is executed, and determines the following rules: if a current call complies with a VPN call criterion, i.e., it is an call within the network, then the SCP providing the VPN service and the SCP providing the PPS cooperate to provide corresponding services for this call by means of invocation and charge for these services; if the current call does not comply with the VPN call criterion, i.e., it is a normal call, then this call is transferred to the SCP providing the PPS by means of transfer to provide the corresponding service and charge for it.

In the process shown in FIG. 6, the process for performing S230 by means of invocation mainly includes the following steps.

the home local SCP provides the corresponding service it can provide for the user; and determines another SCP to be invoked by querying the information arranged in the home local SCP according to service information which cannot be provided to the user by itself;

the home local SCP modifies the received IDP message containing the service request information of the user and transmits the modified IDP message to the SCP to be invoked, with the format of the IDP message being modified to a format complying with the SCP to be invoked;

the invoked SCP provides the corresponding service for the user according to the service request information of the user;

in the case that the invoked SCP has the service invocation capability, the invoked SCP determines whether all of the services that the user requests have been provided, if so, finishes the process, otherwise, queries the information arranged in the home local SCP and invokes the other SCPs so as to trigger the other SCPs to provide the other intelligent services for the user, the invoked SCP repeats the above operation until various SCPs with the service invocation capability cooperate to provide for the user all of the intelligent services that the user requests; if the invoked SCP does not have the service invocation capability, the process for invoking services ends.

Figure 8:
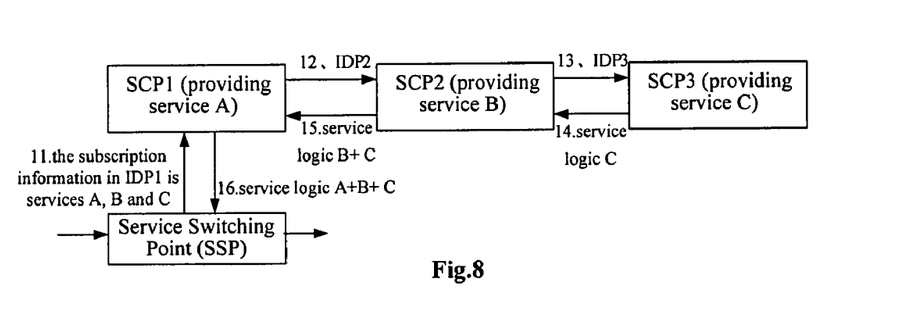
FIG. 8 is a schematic diagram illustrating a process in which multiple SCPs provide services for a user by means of invoking in an IN according to an embodiment of the present invention.

Referring to FIG. 8, there is shown a schematic diagram illustrating a process in which multiple SCPs provide services for a user in an IN according to an embodiment of the present invention. As shown in FIG. 8, assuming that the SCP1 can provide service A, the SCP2 can provide service B and the SCP3 can provide service C, if a user's call requests service A, B and C through an SSP, the process includes the following steps.

Step 11: the SSP transmits an IDP message containing the service request information of the user to the SCP1 to request the services A, B and C.

Step 12: the SCP1 provides service logic A for the user, modifies the IDP1 to the IDP2 and transmits the IDP2 to the SCP2, which also contains the service request information of the user.

Step 13: the SCP2 provides service logic B for the user, modifies the IDP2 to the IDP3 and transmits the IDP3 to the SCP3, which also contains the service request information of the user.

Step 14: the SCP3 provides service logic C for the user; and in conjunction with the following steps 15 and 16, the SCP1, SCP2 and SCP3 together controls the SSP to perform service logic A, service logic B and service logic C for the user, such that the provision of multiple services for the user is implemented by the multiple SCPs by means of invocation.

In the process shown in FIG. 6, the process for performing S230 by means of transfer mainly includes the following steps:

the home local SCP determines another SCP to be invoked by querying the information arranged in the home local SCP according to the service request information of the user;

the home local SCP modifies the received IDP message containing the service request information of the user and transmits the modified IDP message to the SCP to be invoked; and exits the process for providing services;

the invoked SCP provides the corresponding service for the user according to the service request information of the user;

in the case that the invoked SCP has the service invocation capability, it determines whether all of the services that the user requests have been provided, if so, finishes the process, otherwise, queries the information arranged in the home local SCP and invokes the other SCPs so as to trigger the other SCPs to provide the other intelligent services for the user, the invoked SCP repeats the above operation until various SCPs with the service invocation capability provide for the user the corresponding intelligent services that the user requests; if the invoked SCP does not have the service invocation capability, the process for invoking services ends.

Figure 9:
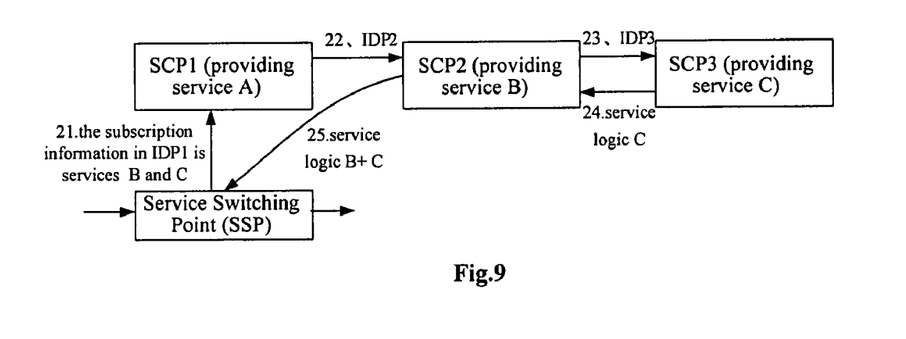
FIG. 9 is a schematic diagram illustrating a process in which multiple SCPs provide services for a user by means of transfer in an IN according to an embodiment of the present invention.

Referring to FIG. 9, there is shown a schematic diagram illustrating a process in which multiple SCPs provide services for a user by means of transfer in an IN according to an embodiment of the present invention. As shown in FIG. 9, also assuming that the SCP1 can provide service A, the SCP2 can provide service B and the SCP3 can provide service C, if a user's call requests service B and C through an SSP, the process includes the following steps.

Step 21: the SSP transmits an IDP message containing the service request information of the user to the SCP1, so as to request the services B and C.

Step 22: the SCP1 determines that it cannot provide a service for the user by itself, determines that the SCP2 is the next SCP to be invoked by querying the information arranged in the home local SCP, and then modifies the IDP1 to the IDP2 and transmits the IDP2 to the SCP2, which also contains the service request information of the user.

Step 23: the SCP2 provides service logic B for the user, modifies the IDP2 to the IDP3 and transmits the IDP3 to the SCP3, which also contains the service request information of the user.

Step 24: the SCP3 provides service logic C for the user; and the SCP2 and SCP3 cooperate to control the SSP to perform service logic B and service logic C for the user, and the SCP1 has already exited the process for providing services for the user, therefore, the provision of multiple services for the user is implemented by the multiple SCPs by means of transfer.

A process and system for implementing the present invention would be described in detail with respect to a signaling exchange process related to the method and system for invoking services in the IN according to an embodiment of the present invention:

Upon receiving a call from a calling/called user, an MSC/SSP in the mobile IN triggers a flow of invoking intelligent services for the user by means of overlay network-based trigger or target network-based trigger, so as to transmit an IDP message to the home local SCP1;

the SCP1 decides whether it is required to provide a corresponding intelligent service by itself according to the received IDP message, the intelligent service it can provide, and the fact whether the user has registered the requested service, so as to decide whether to trigger the next SCP to be invoked (e.g., the SCP2) by means of invocation or by means of transfer;

if the SCP1 determines that it is required to provide a corresponding intelligent service by itself, then the SCP1 determines the address of the SCP2 by means of invocation, and acquires various information required by the SCP2 (e.g., the number of the calling/called user) from the IDP message, for modifying the IDP message so as to re-encapsulate a message format suitable for transmitting to the SCP2, and then the SCP1 transmits the modified IDP message to the SCP2; otherwise, the process goes directly to step 9).

the SCP2 is triggered, thus, a signaling session is established between the SCP1 and SCP2, the SCP1 is required to parse and respond to subsequent signaling operations such as RRBE/AC transmitted from the SCP2;

the SCP1 is required to normally control the call of the SSP and to issue the signaling for controlling the call, including RRBE, AC, CONN (Connect) etc., and selectively issues the events reported by the SSP to the SCP2 according to its own logic;

the MSC/SSP proceeds with subsequent signaling operations to connect the call to the called user;

both in the case that the session between the calling user and the called user ends and in the case that either of the calling user and the called user hangs up, the MSC/SSP reports the hang-up event to the SCP1, and before issuing an instruction to release the call, the SCP1 is still required to transmit the hang-up event reported from the SSP to the SCP2 and to respond to the signaling fed back from the SCP2;

after the SCP2 receives the hang-up signaling and finishes the current call (i.e., the SCP2 finishes the current service logic processing it provides, because the SCP2 presumes the existence of a certain call, which is actually pretended by the SCP1), the SCP1 re-issues an instruction to release the call and finishes its own service logic processing, accordingly, the whole process for invoking services ends;

when the SCP1 determines that the SCP1 is not required to provide a corresponding intelligent service by itself, then the SCP1 determines the next SCP to be invoked (e.g., the SCP2) by means of transfer, and in the first transmitted signaling (i.e., TC_CONTINUE), modifies a source address to the address of the SCP2 to be invoked; as such, all of the subsequent signaling transmitted from the SSP will not pass through SCP1, and are directly forwarded to the SCP2.

In the method and system for invoking services in the IN according to the embodiments of the present invention, the invocations among the SCPs in communications may be implemented through Signaling System No. 7 (e.g., SS7, etc.). Similarly, it is possible to implement the invocations among the SCPs in communications through Data Communication Network (e.g., TCP/IP network, IPX network, X.25 network, etc.). For example, a certain network does not have an "Address Forward" capability, then the transfer could not be implemented among various SCPs, but the invocation is independent of the type of the network, could be implemented.

It is obvious to the skilled in the art that various changes and modifications may be made to the present invention without departing from the spirit and scope of the present invention, and it is intended that the present invention covers these changes and modifications provided that they fall within the scope of the present invention as defined by the appended claims and their equivalents.

What is claimed is:

1. A method for invoking services in an Intelligent Network, comprising:
   receiving, by a first service control point, service request information transmitted by a service switching point, wherein the service request information contains information about a first service and a second service requested by a user, the first service control point is capable of invoking a service;
   providing, by the first service control point, the first service;
   determining, by the first service control point, a second service control point corresponding to the second service according to the service request information, and invoking the second service control point to provide the second service.

2. The method for invoking services in the Intelligent Network according to claim 1, further comprising:
   storing, by the first service control point, a correspondence between the service control points and intelligent services, and
   querying, by the first service control point, the correspondence according to the service request information of the user to determine the second service control point corresponding to the second service.

3. The method for invoking services in the Intelligent Network according to claim 1, wherein the invoking of the second service control point comprises:
   modifying, by the first service control point, an Initial Detect Point message containing the service request information, and transmitting the modified Initial Detect Point message to the second service control point.

4. The method for invoking services in the Intelligent Network according to claim 3, wherein the second service control point is capable of invoking a service, and the second service control point determines and invokes the other service control points capable of providing the other services corresponding to the other requested services.

5. The method for invoking services in the Intelligent Network according to claim 3, wherein the first service control point modifies the address of the first service control point contained in the Initial Detect Point message to the address of the second service control point.

6. The method for invoking services in the Intelligent Network according to claim 1, further comprising:
   reporting, by the service switching point, a hang-up event to the first service control point when detecting that the user hangs up;
   transmitting, by the first service control point, the hang-up event to the second service control point and responding to a signaling fed back from the second service control point; and
   issuing, by the first service control point, an instruction to release the call.

7. A system for invoking services, comprising a service switching point, a first service control point and a second service control point, wherein
   the service switching point is capable of transmitting service request information containing information about a first service and a second service to the first service control point; and
   the first service control point is capable of receiving the service request information transmitted by the service switching point, providing the first service, determining a second service control point capable of providing the second service, and invoking the second service control point according to the service request information;
   the second service control point being capable of providing the second service in response to the invocation by the first service control point.

8. The system for invoking services according to claim 7, wherein the first service control points is further capable of storing a correspondence between service control points and intelligent services, and querying the correspondence according to the service request information of the user to determine the second service control point corresponding to the second service.

9. The system for invoking services according to claim 7, wherein the service switching point is further capable of reporting a hang-up event to the first service control point when detecting that the user hangs up, and the first service control point is further capable of transmitting the hang-up event to the second service control point, responding to a signaling fed back from the second service control point, and issuing an instruction to release the call.

10. A service control point for invoking services, comprising:

a unit capable of receiving service request information transmitted by a service switching point, wherein the service request information contains information about a first service and a second service requested by a user;

a service processing unit capable of providing the first service;

a determining unit capable of determining a second service control point corresponding to the second service according to the service request information; and an invoking unit capable of invoking the second service control point to provide the second service according to the service request information.

11. The service control point according to claim 10, further comprising:

a call release instructing unit capable of transmitting a hang-up event reported by the service switching point to the second service control point, responding to a signaling fed back from the second service control point, and issuing an instruction to release the call.

* * * * *